United States Patent
Nice et al.

(10) Patent No.: US 8,156,249 B2
(45) Date of Patent: Apr. 10, 2012

(54) USING SERVER TYPE TO OBTAIN NETWORK ADDRESS

(75) Inventors: Nir Nice, Kfar Veradim (IL); Philip Derbeko, Modiin (IL); Anat Bar-Anan, Tel Aviv (IL); Anat Eyal, Tel Aviv (IL)

(73) Assignee: Microsoft Corporation, Redmond, WA (US)

( * ) Notice: Subject to any disclaimer, the term of this patent is extended or adjusted under 35 U.S.C. 154(b) by 272 days.

(21) Appl. No.: 12/389,409

(22) Filed: Feb. 20, 2009

(65) Prior Publication Data

US 2010/0217890 A1    Aug. 26, 2010

(51) Int. Cl.
*G06F 15/16* (2006.01)

(52) U.S. Cl. ......... 709/245; 370/392; 370/401; 370/466

(58) Field of Classification Search .................. 709/245; 370/392, 401, 466
See application file for complete search history.

(56) References Cited

U.S. PATENT DOCUMENTS

| | | | |
|---|---|---|---|
| 6,449,657 B2 * | 9/2002 | Stanbach et al. ............... | 709/245 |
| 7,315,543 B2 * | 1/2008 | Takeuchi et al. ............... | 370/392 |
| 7,328,281 B2 | 2/2008 | Takeda et al. | |
| 7,415,536 B2 | 8/2008 | Nakazawa | |
| 2003/0187882 A1 | 10/2003 | Jinmei et al. | |
| 2004/0073707 A1 | 4/2004 | Dillon | |
| 2004/0141513 A1 | 7/2004 | Takechi et al. | |
| 2006/0242227 A1 | 10/2006 | Rao et al. | |
| 2008/0069137 A1 | 3/2008 | Jimmei | |
| 2009/0031042 A1 * | 1/2009 | Phatak .......................... | 709/245 |

OTHER PUBLICATIONS

Yoon et al., "MTI: Integration of UNA and MTAII toward the Next Generation Internet", Retrieved at<<http://ieeexplore.ieee.org/stamp/stamp.jsp?arnumber=01431699>>, Dec. 24, 2008, pp. 442-449.

Hitachi et al., "Dual Stack Hosts using the "Bump-In-the-Stack" Technique (BIS)", Retrieved at<<http://www.ipv6-tf.com.pt/documentos/files/RFCs/rfc2767.txt>>, Feb. 2000, pp. 1-12.

* cited by examiner

*Primary Examiner* — Yves Dalencourt (57) ABSTRACT

In aspects, a gateway that sits between a single network protocol client and a server receives a request from the client for a network address of the server. The gateway issues multiple name resolution requests and waits for a first response. Depending on various factors, the gateway determines whether or not to wait for additional responses before responding to the client. If needed, the gateway may obtain an address of a translating device to assist the client in communicating with the server.

12 Claims, 5 Drawing Sheets

USING SERVER TYPE TO OBTAIN NETWORK ADDRESS

BACKGROUND

With the increased acceptance of Internet Protocol version 6 (IPv6), more organizations are adopting IPv6 clients. Such clients may be capable of connecting to other entities using IPv6 only. Network entities may be registered as IPv4 entities, IPv6 entities, or both IPv4 and IPv6 entities. To communicate with a network entity that may be registered as an IPv4 entity, an IPv6 entity, or both, one or more devices may be placed in the communication path between the client and the network entity. Current mechanisms for handling lookup and communication in a potentially mixed IPv4 and IPv6 environment may perform undesirably.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to using server type to obtain a network address. In aspects, a gateway that sits between a single network protocol client and a server receives a request from the client for a network address of the server. The gateway issues multiple name resolution requests and waits for a first response. Depending on various factors, the gateway determines whether or not to wait for additional responses before responding to the client. If needed, the gateway may obtain an address of a translating device to assist the client in communicating with the server.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. Other definitions, explicit and implicit, may be included below.

Exemplary Operating Environment

Figure 1:
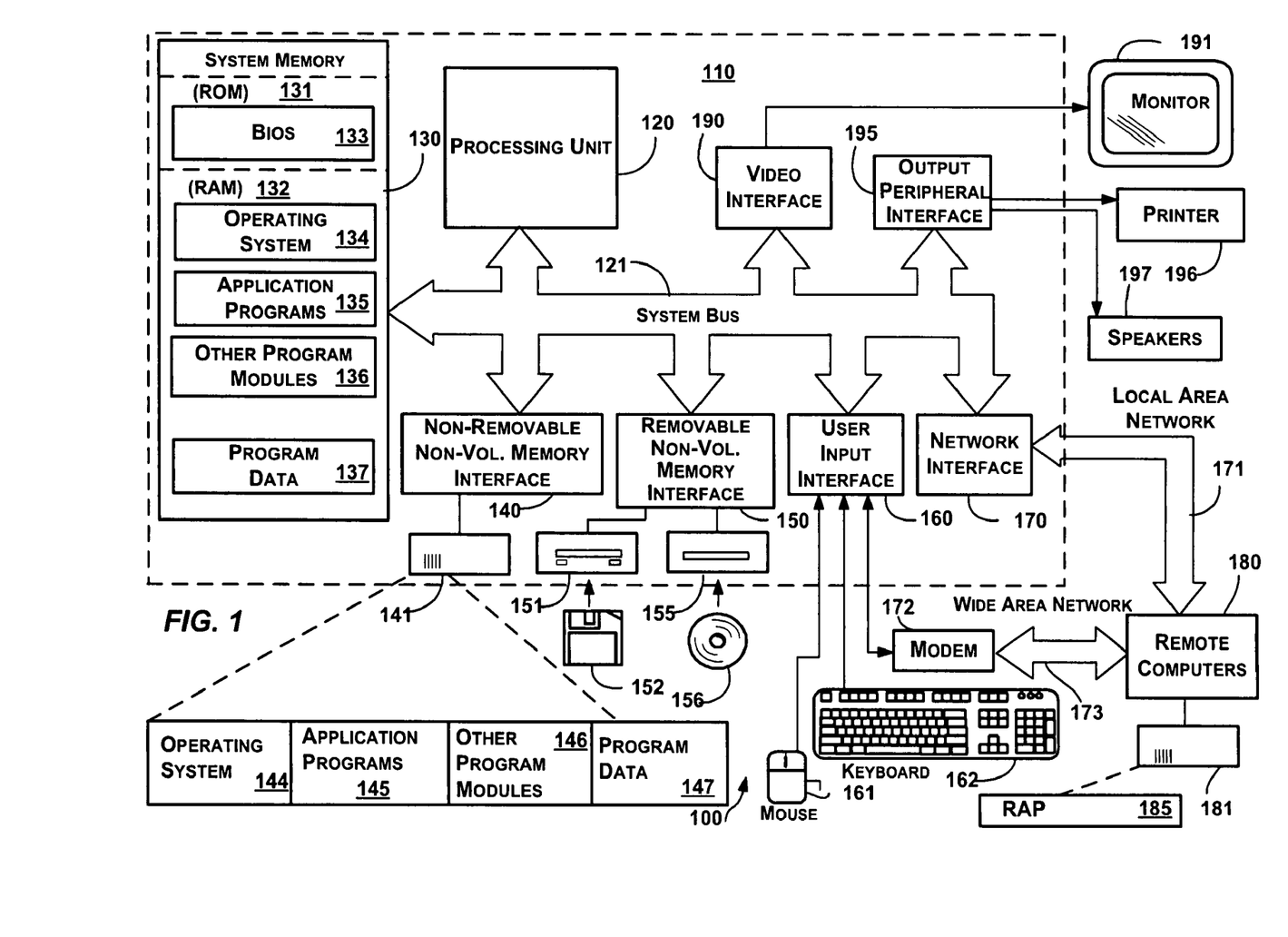
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and non-volatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Server Type Caching

Figure 2:
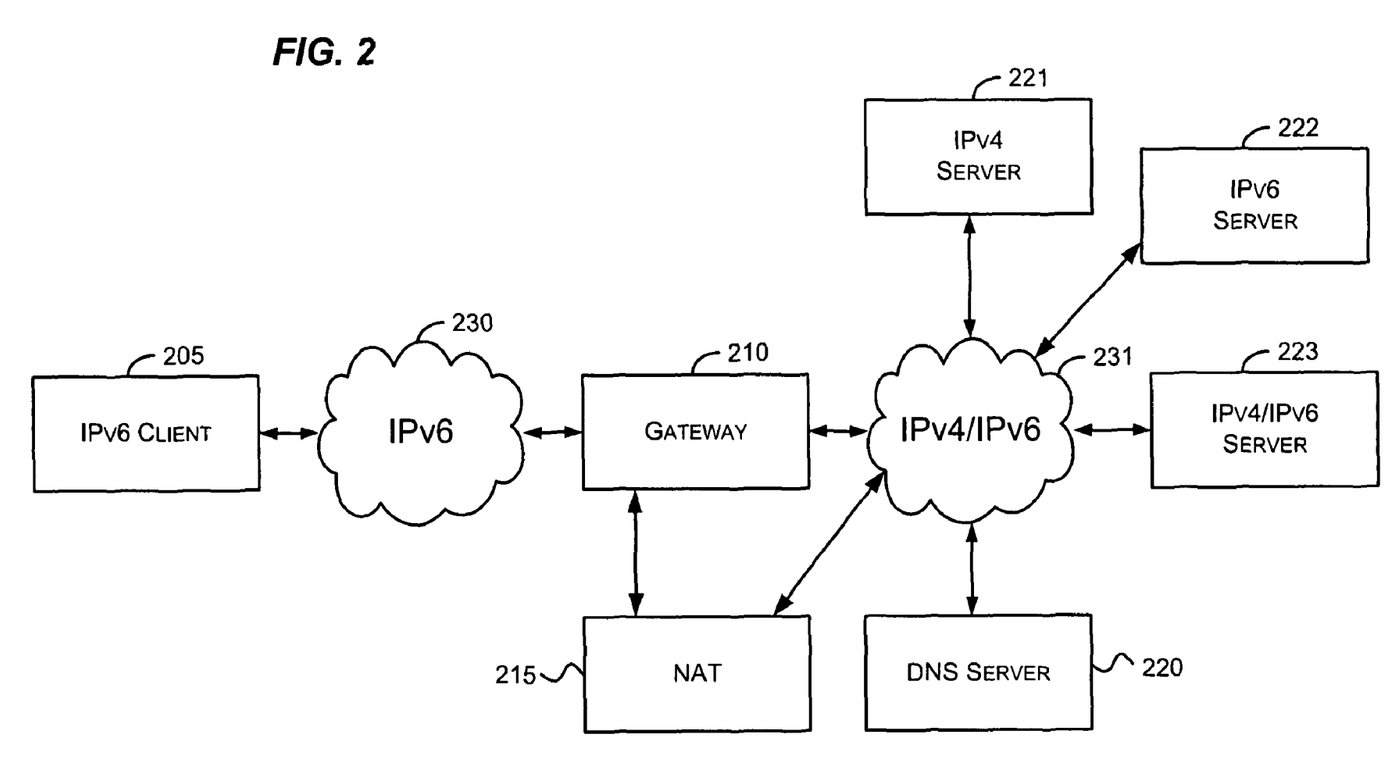
FIG. 2 is a block diagram representing an exemplary environment in which aspects of the subject matter described herein may be implemented.

As mentioned previously, current mechanisms for handling lookup and communication in a potentially mixed IPv4 and IPv6 environment may perform undesirably. FIG. 2 is a block diagram representing an exemplary environment in which aspects of the subject matter described herein may be implemented. The environment may include a client 205, a gateway 210, a network address translation (NAT) 215, a domain name system (DNS) server 220, servers 225-227, networks 230-231, and may include other entities (not shown). The various entities depicted in FIG. 2 may be located relatively close to each other or may be distributed across the world. The various entities may communicate with each other via various networks including intra- and inter-office networks and the networks 230-231.

In an embodiment, the network 230-231 may comprise or be part of the Internet. In an embodiment, the networks 230-231 may comprise one or more local area networks, wide area networks, direct connections, virtual connections, private networks, virtual private networks, some combination of the above, and the like. In an embodiment, the client 205 uses the IPv6 protocol to communicate with the gateway 210 while the gateway 210 may communicate with other entities connected to the network 231 using one or both of the IPv4 and the IPv6 protocols. In one embodiment, the network 230 may be used for both IPv4 and IPv6 traffic. As known to those skilled in the art, IPv4 is a protocol identified by Request for Comments 791 while IPv6 is a protocol identified by Request for Comments 2460.

The client 205 may comprise or reside on one or more general or special purpose computing devices. Such devices may include, for example, personal computers, server computers, hand-held or laptop devices, multiprocessor systems, microcontroller-based systems, set top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as the client 205 indicated in FIG. 2 comprises the computer 110 of FIG. 1.

In one embodiment, the client 205 may be configured to communicate using the IPv6 protocol only. Using the IPv6 protocol, the client may communicate with other IPv6 entities connected to the network 230 including the gateway 210 using mechanism that are well understood by those skilled in the art.

Although the terms "client" and "server" are sometimes used herein, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. In an embodiment, a client and a server may both be peers, servers, or clients. In one embodiment, a client and a server may be implemented on the same physical machine.

As used herein, each of the terms "server" and "client" may refer to one or more physical entities, one or more processes executing on one or more physical entities, and the like. Thus, a server may include an actual physical node upon which one or more processes execute, a service executing on one or more physical nodes, or a group of nodes that together provide a service. A service may include one or more processes executing on one or more physical entities. Furthermore, a single process may implement one or more servers.

The gateway 210, NAT 215, and servers 220-223 may also reside on one or more general or special purpose computing devices (such as the devices mentioned in conjunction with the client 205). An exemplary device that may be configured to act as an entity mentioned above comprises the computer 110 of FIG. 1.

The DNS server 220 resolves network names (e.g., www.example.com) to IP addresses. When the DNS server 220 receives a request to resolve a network name, the DNS server 220 may look up an IP address associated with the network name using one or more data structures.

In one embodiment, the DNS server 220 may comprise a "dual stack" DNS server. In this embodiment, the DNS server 220 may be asked to resolve network names into both IPv4 addresses and IPv6 addresses. Furthermore, a single server may have both an IPv4 address and an IPv6 address. Thus, two different types of addresses (e.g., an IPv4 and an IPv6 address) may refer to the same server.

The server 221 may comprise an IPv4 server that is capable of communicating via the IPv4 protocol only. The server 222 may comprise an IPv6 server that is capable of communicating via the IPv6 protocol only. The server 223 may comprise an IPv4/IPv6 server that is capable of communicating via the IPv4 protocol and the IPv6 protocol.

The gateway 210 sits between the client 205 and entities outside of the network 230 and may act as a DNS proxy or a transparent DNS filter. In one embodiment, the gateway 210 operates as a DNS application level gateway (hereinafter sometimes referred to as a DNS-ALG). The gateway 210 receives DNS queries from the client 205, queries the DNS server 220 to obtain network name resolution, and returns results of the name resolution to the client 205 as appropriate. To obtain a network address for a given DNS query from the client 205, the gateway 210 may submit one or more DNS queries to the DNS server 220. One of the queries may comprise a query for an IPv4 address of the network name while another of the queries may comprise a query for an IPv6 address of the network name.

When a server is registered via only one of IPv4 or IPv6, the gateway 210 may receive only one address from the DNS server 220 for a given network name. When a server has a registered network address for both IPv4 and IPv6, however, the DNS server 220 may send addresses to both an IPv4 name resolution request and an IPv6 name resolution request. It is possible for either of the responses (e.g., the IPv4 address or the IPv6 address) to be returned first.

In some implementations, when a DNS-ALG receives an IPv4 address first in a response from a DNS server, the DNS-ALG may automatically obtain a "fake" IPv6 address from the NAT 215. Alternatively, the DNS-ALG may generate the "fake" IPv6 address according to a pre-defined scheme that the NAT 215 is aware of as well. The DNS-ALG then forwards this "fake" IPv6 address to the client to indicate the address to which the client was to communicate with the end server.

This IPv6 address is referred to as "fake" because it addresses (e.g., points to) the NAT 215, not the end server. When the client 205 sends a message using this "fake" address, the message is first sent to the NAT 215 which then translates and re-packages the message in an IPv4 format for sending to the end server. The NAT 215 uses its own IPv4 address as the source address of this new formatted IPv4 packet. When the end server responds to a message from the client 205, the end server responds to the NAT 215 as the NAT 215 appears (to the server) to be the source of the modified packet. When the NAT 215 receives a response from the end server, the NAT 215 re-packages the response into an IPv6 message that includes the "fake" address of the NAT 215 as the source of the packet to send to the client so that the client 205 will continue to send all messages to the end server via the NAT 215.

Translating between IPv4 and IPv6 messages and passing these messages via the NAT 215 involves some overhead and may increase latency and decrease throughput of messages. Furthermore, security protocols and incompatibilities between IPv4 and IPv6 may add to the challenge of communicating via the NAT 215.

A mechanism that may be used in this environment is as follows:

1. The gateway 210 is configured to interpret all DNS queries from the client 205 and act as a DNS server to the client (e.g., as DNS proxy or transparent DNS filter).

2. The default type for "server type" (e.g., IPv4 or IPv6) is defined. If, for example, a system administrator or the like (hereinafter "system administrator") wants to optimize communication for IPv4 use, then the default server type may be defined as an IPv4 server. If, for example, the system administrator wants to optimize for native IPv6 use (e.g., to reduce the use of the NAT 215), then the default server type may be defined as an IPv6 server.

3. Upon receiving a DNS query for an IPv6 address (sometimes referred to herein as an "AAAA query"), the gateway 210 may send both an IPv4 query (sometimes referred to as an "A query") and an AAAA query to the DNS server 220.

4. If the response to the AAAA query is received by the gateway 210 first:

A. If the response includes an IPv6 address, then the gateway 210 returns the AAAA response to the client 205 and marks the server as an IPv6 server in the server type cache. Note that the server type cache may be set without an expiration for each cache entry. In this embodiment, cache entries may be kept until they are needed for new entries. Because servers infrequently change from IPv4 to IPv6 or from IPv6 to IPv4, this behavior will not typically negatively impact performance.

B. If the response indicates that there is no resolution to the network name, the gateway 210 marks the server as an IPv4 server in the server type cache and waits for a response to the A query. After the gateway 210 receives the A response, the gateway obtains a "fake" IPv6 address from the NAT 215 and returns this "fake" address to the client 205.

C. If the response indicates that a timeout has occurred, then the gateway 210 may send another AAAA query to the DNS server 220.

5. If a response to the A query arrives first with a valid IPv4 address, then:

A. If the server is marked as an IPv4 server in the server type cache, then the gateway 210 obtains a "fake" IPv6 address from the NAT 215 and returns this "fake" address to the client 205. When a response to the AAAA query arrives, the gateway 210 performs one of the following:

i. If the AAAA response indicates a valid IPv6 address, then the gateway 210 marks the server to be an IPv6 server in the server type cache.

ii. If the AAAA response indicates that there is no registration of the server, then the gateway 210 may do nothing.

iii. If the AAA response indicates a timeout, then the gateway 210 may send another AAAA query to the DNS server 220.

B. If the server is marked as an IPv6 server in the server type cache, then the gateway 210 waits for an AAAA response and performs one of the following actions:

i. If the gateway 210 receives an AAAA response with a valid IPv6 address, then the gateway 210 returns the IPv6 address to the client 205.

ii. If the gateway 210 receives an AAAA response that indicates that the server is not registered or if "wait for AAAA time" expires, then the gateway 210 marks the server as an IPv4 server in the server type cache and obtains a "fake" address from the NAT 215. The gateway 210 then sends this "fake" address to the client 205.

iii. If the gateway 210 receives an AAAA response with a timeout, the gateway 210 may send another AAAA query to the DNS server 220.

6. If an A response that indicates no registration arrives first, then the gateway 210 marks the server as an IPv6 server in the server type cache, waits for an AAAA response, and returns the AAAA response to the client 205.

7. If an A response that indicates timeout arrives first, the gateway 210 may send another A query to the DNS server 220 and may, after time has expired after the second A query has been sent, mark the server as an IPv6 server in the server type cache.

In one embodiment, if a server is marked as IPv6 capable in the server type cache, the gateway 210 may omit sending a name resolution request to an IPv4 DNS server unless a response from the IPv6 DNS server indicates an error. This may decrease the load of IPv4 DNS servers.

The examples given above of different actions that may be undertaken to provide a network address to an IPv6 client are not intended to be all-inclusive or exhaustive. Based on the teachings herein, those skilled in the art may recognize other actions that may be undertaken to provide a network address to an IPv6 client without departing from the spirit or scope of aspects of the subject matter described herein.

Although the environments described above includes various entities, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
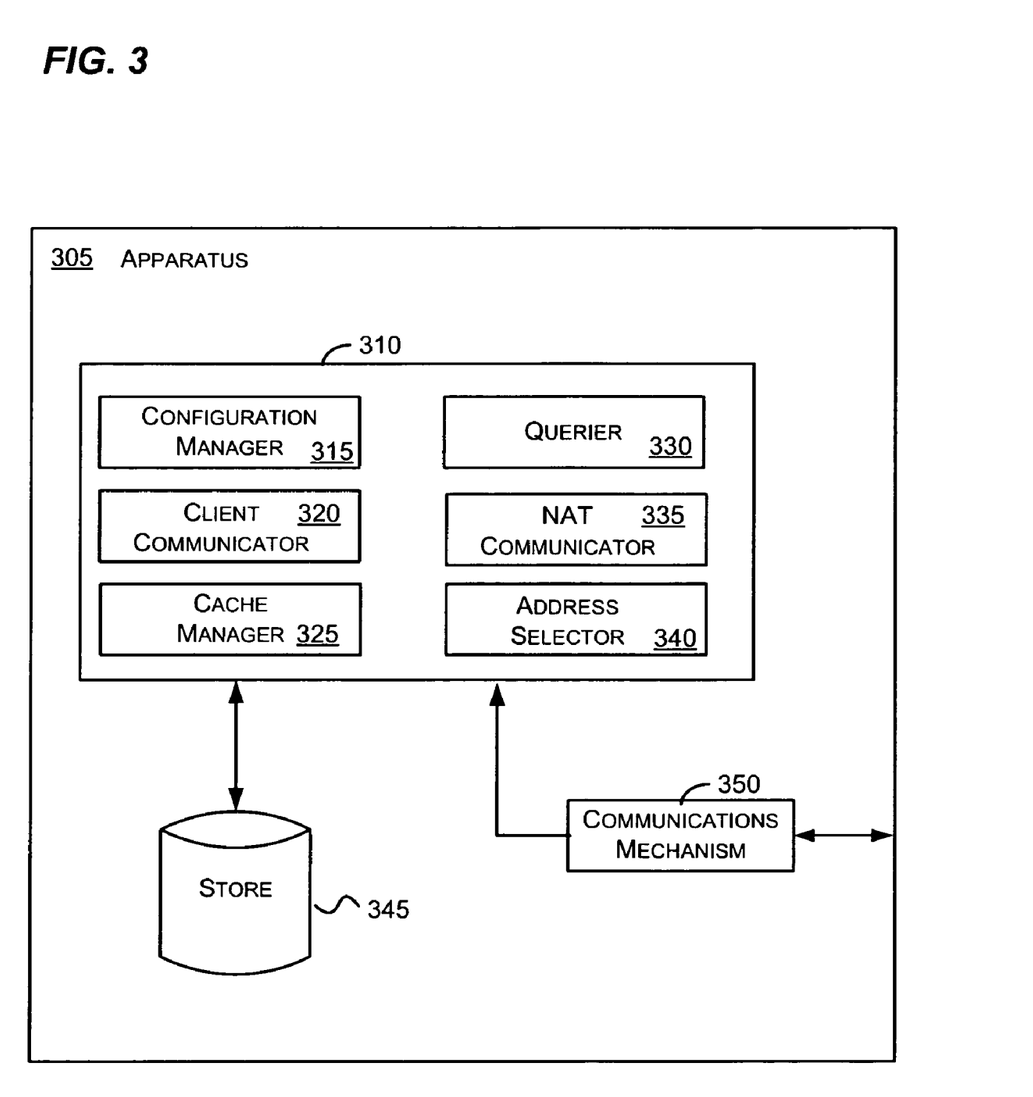
FIG. 3 is a block diagram that represents an apparatus configured as a gateway in accordance with aspects of the subject matter described herein.

FIG. 3 is a block diagram that represents an apparatus configured as a gateway in accordance with aspects of the subject matter described herein. The components illustrated in FIG. 3 are exemplary and are not meant to be all-inclusive of components that may be needed or included. In other embodiments, the components and/or functions described in conjunction with FIG. 3 may be included in other components (shown or not shown) or placed in subcomponents without departing from the spirit or scope of aspects of the subject matter described herein. In some embodiments, the components and/or functions described in conjunction with FIG. 3 may be distributed across multiple devices.

Turning to FIG. 3, the apparatus 305 may include name resolution components 310, a store 345, and a communications mechanism 350. The name resolution components 310 may include a configuration manager 315, a client communicator 320, a cache manager 325, a querier 330, a NAT communicator 335, and an address selector 340.

The communications mechanism 350 allows the apparatus 305 to communicate with other entities shown in FIG. 2. The communications mechanism 350 may be a network interface or adapter 170, modem 172, or any other mechanism for establishing communications as described in conjunction with FIG. 1.

The store 345 is any storage media capable of storing data. The term data is to be read broadly to include anything that may be stored on a computer storage medium. Some examples of data include information, program code, program state, program data, other data, and the like. The store 345 may comprise a file system, database, volatile memory such as RAM, other storage, some combination of the above, and the like and may be distributed across multiple devices. The store 345 may be external, internal, or include components that are both internal and external to the apparatus 305.

In particular, the store 345 may be used by the cache manager 325 to store type information for servers. Type information may indicate, for example, that the server is an IPv4 server or an IPv6 server. As indicated in the algorithm presented in conjunction with FIG. 2, the type information may be used to determine whether to wait for both name resolution responses before sending a response to the client. For example, if an A response arrives first and the server type is IPv4, instead of waiting for the AAAA response, the gateway may obtain a "fake" address from a NAT and return this address to the client.

The configuration manager 315 is operable to receive an indication of a default type for servers for which the cache has no type information. As indicated previously, to optimize for speed the default type may be set (e.g., via the configuration manager 315) to IPv4 while to optimize for avoiding use of the NAT, the default type may be set to IPv6.

The client communicator 320 receives messages from and sends messages to the client. The client communicator 320 may be operable to look for DNS query requests and to pass such requests to other of the name resolution components 310.

The cache manager 325 may be operable to store and retrieve types for servers in the store 345. Each type for a server may indicate one of a first (e.g., IPv6) and second (e.g., IPv4) network protocols. The cache manager 325 may update the cache as responses are received even after a response has been sent to the client.

The querier 330 is operable to send a first request for an address to a DNS server that resolves IPv6 requests and to send a second request for an address to a DNS server that resolves IPv4 requests. Note that the DNS server that resolves IPv6 requests may reside on a different or the same physical device as the DNS server that resolves IPv4 requests. In an embodiment, the DNS server that responds to IPv4 requests may also be the DNS server that responds to IPv6 requests.

In some embodiments, the querier 330 may be broken into two or more components that query different DNS servers.

The NAT communicator 335 is operable to communicate with a network address translation service that provides a "fake" address to send to the client. For example, when the address selector 340 determines that an IPv4 address is to be used, the NAT communicator 335 may be used to obtain an IPv6 address from a network address translation service. The client can then send messages to this IPv6 address which are then re-packaged and relayed to the server.

The address selector 340 is operable to determine whether or not to wait for both the first and second servers to respond before sending a response to the client. As mentioned previously, for speed purposes, it may be desirable to send a response to the client as soon as a response has been received in regards to a name resolution request.

One or more of the components above may be implemented as one or more processes. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or may execute on a single device.

Figure 4:
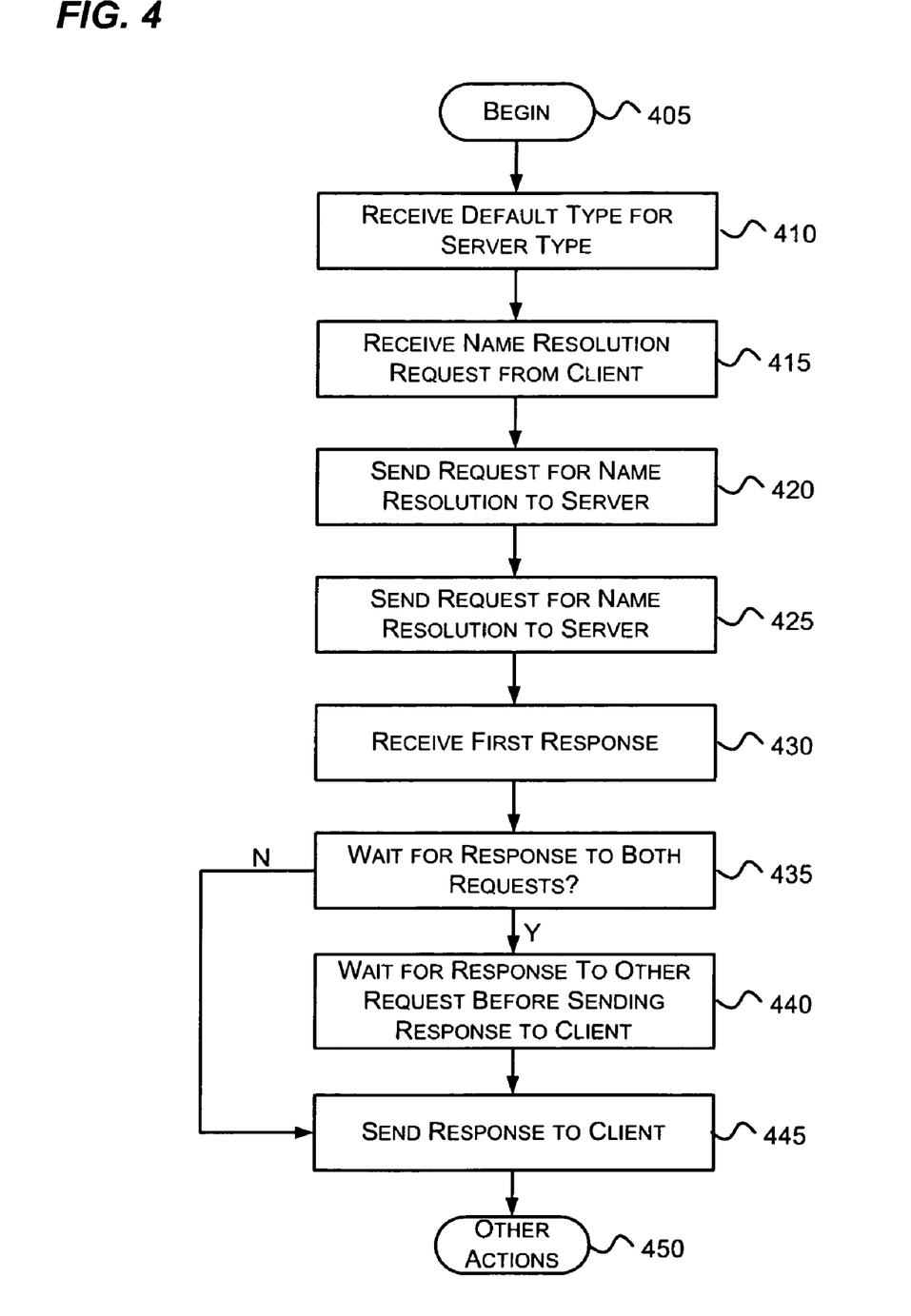
FIG. 4 is a flow diagram that generally represents actions that may occur on a gateway in accordance with aspects of the subject matter described herein.
Figure 5:
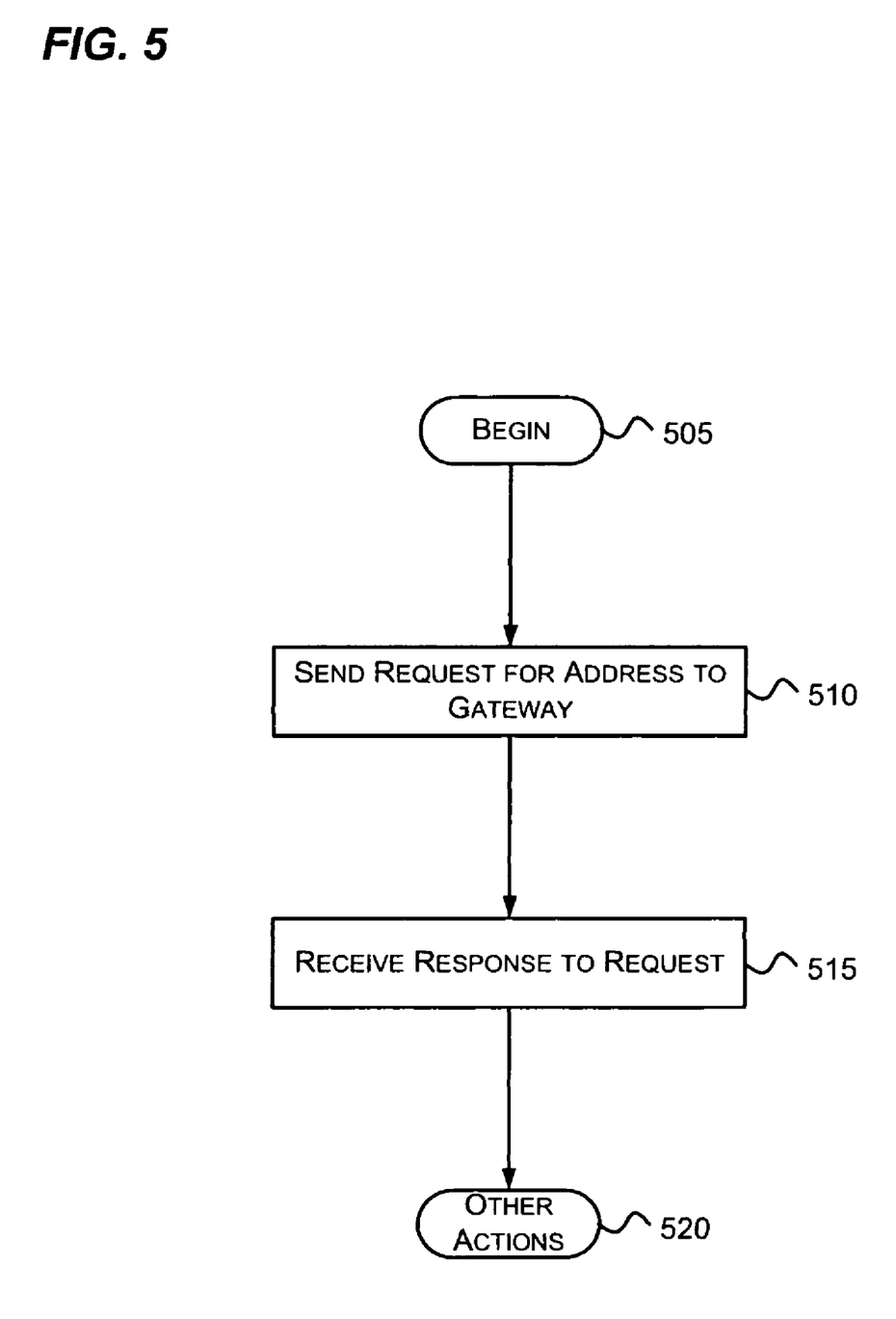
FIG. 5 is a flow diagram that generally represents actions that may occur on a client in accordance with aspects of the subject matter described herein.

FIGS. 4-5 are flow diagrams that generally represent actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 4 is a flow diagram that generally represents actions that may occur on a gateway in accordance with aspects of the subject matter described herein. At block 405, the actions begin.

At block 410, a default type for the server type is received. For example, referring to FIG. 305, the configuration manager 315 receives a default server type of IPv4 from a system administrator.

At block 415, a name resolution request is received from a client. For example, referring to FIG. 2, the gateway 210 receives a request for an address corresponding to a network name of the IPv4/IPv6 server 223. As mentioned previously, the client 205 may be capable of communicating via a single network protocol (e.g., IPv6).

At block 420, a request for name resolution is sent to a server. For example, referring to FIG. 2, the gateway 210 may send a request for the address to a server (e.g., DNS server 220) that resolves network names for a first network protocol (e.g., IPv6).

At block 425, a request for name resolution is sent to a server. For example, referring to FIG. 2, the gateway 210 may send a request for the address to a server (e.g., DNS server 220) that resolves network names for a second network protocol (e.g., IPv4). Note, that the actions of blocks 420 and 425 may occur in parallel or in a different order without departing from the spirit or scope of aspects of the subject matter described herein.

At block 430, a first response to either of the requests is received. For example, referring to FIG. 2, the gateway may first receive a response to either the IPv4 or the IPv6 requests from the DNS server 220.

At block 435, a determination is made as to whether to wait for both responses before responding to the client. If so, the actions continue at block 440; otherwise, the actions continue at block 445. For example, referring to FIGS. 2 and 3, if the server type is IPv4 and a first response is a valid IPv4 address, the address selector 340 may determine that there is no need to wait for a second response and may obtain a "fake" address from the NAT 215. This may be done by sending the valid address to a network address translator (e.g., the NAT 215), obtaining a second address (e.g., IPv6 address) from the NAT 215 where the IPv6 address refers to the NAT 215, inserting the second address into a client response to send to the client, and sending the client response to the client. If the gateway afterwards receives a response that includes a valid IPv6 address, the gateway may update cache to indicate that the server (e.g., the IPv4/IPv6 server 223) is capable of communicating via the IPv6.

As another example, if the first response is a valid IPv6 address, this address may be sent to the IPv6 client 205 before waiting for another response that includes IPv4 information. In addition, in this case, the server type may be cached as an IPv6 server.

As yet another example, if the first response indicates that the network name is not registered for a specific protocol (e.g., IPv4), the gateway may cache that the network name has a different type (e.g., IPv6) and may wait for another response.

Based on the discussion regarding possible outcomes of responses from DNS servers described above in conjunction with FIG. 2, other examples of actions the gateway 210 may take will be apparent.

At block 440, the gateway waits for a second response to its other outstanding request before sending a response to the client. For example, referring to FIG. 2, the gateway 210 waits for a response to its outstanding requests (e.g., the "AAAA" request) before responding to the request from the client.

At block 445, a response is sent to the client. For example, referring to FIG. 2, the gateway 210 sends a network address to the IPv6 client 205 by which the client 205 may communicate with the IPv4/IPv6 server 223 either directly or via the NAT 215.

At block 450, other actions, if any, are performed.

FIG. 5 is a flow diagram that generally represents actions that may occur on a client in accordance with aspects of the subject matter described herein. At block 505, the actions begin.

At block 510, a client sends a request for an address to a gateway. For example, referring to FIG. 2, the IPv6 client 205 sends to the gateway 210 a request for an address of the IPv4/IPv6 server 223.

At block 515, the client receives a response to the request. For example, referring to FIG. 2, the IPv6 client 205 receives a response from the gateway 210.

At block 520, other actions, if any, are performed.

Although mechanism have been described herein for dealing with the IPv4 and IPv6 protocols, in other embodiments, this mechanism may also be applied to other protocols or more than two protocols without departing from the spirit or scope or aspects of the subject matter described herein.

As can be seen from the foregoing detailed description, aspects have been described related to using server type to obtain a network address. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   receiving a first request from a client for an address corresponding to a network name, the client being configured to communicate via a first network protocol;
   in response to the first request received from the client for the address, issuing multiple name resolution requests to obtain the address, issuing the multiple name resolution requests comprising sending a second request for the address to a server that resolves network names for the first network protocol and sending a third request for the address to a server that resolves network names for a second network protocol; and
   receiving a first response to either the second request or the third request, wherein receiving a first response to either the second request or the third request comprises receiving the first response in regards to the third request, the first response indicating that the network name is not registered for the second network protocol and further comprising indicating that the network name is associated with the first network protocol and waiting for a response in regards to the second request before sending a response to the client.

2. The method of claim 1, wherein the first network protocol comprises an Internet Protocol version 6 (IPv6) protocol identified by Request for Comments (RFC) 2460.

3. The method of claim 1, wherein the second network protocol comprises an Internet Protocol version 4 (IPv4) protocol identified by Request for Comments (RFC) 791.

4. The method of claim 1, wherein the server that resolves network names for the first network protocol is also the server that resolves network names for the second network protocol.

5. A computer storage medium, the computer storage medium not consisting of a propagating signal, the computer storage medium having computer-executable instructions, which when executed perform actions, comprising:
   from a client, sending a request for an address corresponding to a network name to a gateway, the client being configured to communicate over a network using a single network communication protocol, the gateway having a cache in which the gateway stores a type corresponding to the network name, the type indicating one of two network protocols associated with the network name, the gateway configured to send requests to one or more name resolution servers to resolve the network name to the address, the gateway having logic thereon for determining whether or not to wait for responses to all the requests to the one or more name resolution servers before sending a response to the request from the client; and
   receiving a response to the request, the response including the address, wherein the gateway is further configured to check the type and potentially wait for another response to the requests before responding to the client when the gateway receives a valid address for the network name for a network communication protocol other than the single network communication protocol.

6. The computer storage medium of claim 5, wherein the gateway is further configured to send the response to the request without waiting for another response from the one or more name resolution servers upon receiving a valid address for the network name from a name resolution server of the single network communication protocol.

7. The computer storage medium of claim 5, wherein the gateway is further configured to update the type based on responses receives from the one or more name resolution servers.

8. In a computing environment, an apparatus, comprising:
   a cache configured to store types for servers, each type indicating one of a first and second network protocols;
   a configuration manager configured to receive an indication of a default type for servers for which the cache has no type information;
   a client communicator configured to receive a first request from a client for an address corresponding to a network name of a server, the client being configured to communicate via a first network protocol;

a querier configured to issue multiple name resolution requests to obtain the address comprising send a second request for the address to a server that resolves network names for the first network protocol and to send a third request for the address to a server that resolves network names for the second network protocol; and an address selector configured to determine whether or not to wait for responses to both the second and third requests before sending a response to the client, wherein if the querier receives a response to the third request before receiving a response to the second request, the address selector is further configured to determine a type associated with the network name and to use the type in determining whether to wait for a response to the second request before sending a response to the client.

9. The apparatus of claim 8, wherein the apparatus is logically located between the client and a network that has entities that are configured to communicate via the first and/or second network protocol, the network including an entity associated with the network name.

10. The apparatus of claim 8, wherein if the querier receives a response to the second request before receiving a response to the third request, the address selector is further configured to determine to provide to the client an address conveyed with the response to the second request.

11. The apparatus of claim 8, further comprising a cache manager configured to update a store with respect to a type of entity associated with the network name based on one or more responses to the second and third requests.

12. The apparatus of claim 8, further comprising a translator communicator configured to obtain an address from a network address translator in response to receiving a response to the third request when a type associated with the network name indicates the second network protocol.

* * * * *